United States Patent
Yong

(10) Patent No.: US 11,984,095 B1
(45) Date of Patent: May 14, 2024

(54) INFORMATION HANDLING SYSTEM DISPLAY CURVATURE ADJUSTMENTS BASED ON VIEWING DISTANCE AND CONTENT

(71) Applicant: Dell Products L.P., Round Rock, TX (US)

(72) Inventor: Khang Chian Yong, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/299,925

(22) Filed: Apr. 13, 2023

(51) Int. Cl.
G09G 5/00 (2006.01)
G02F 1/1333 (2006.01)
G06F 1/16 (2006.01)

(52) U.S. Cl.
CPC ....... *G09G 5/003* (2013.01); *G02F 1/133305* (2013.01); *G02F 1/133322* (2021.01); *G06F 1/1652* (2013.01); *G09G 2320/028* (2013.01); *G09G 2320/0606* (2013.01); *G09G 2320/0613* (2013.01); *G09G 2320/068* (2013.01); *G09G 2380/02* (2013.01)

(58) Field of Classification Search
None
See application file for complete search history.

(56) References Cited

U.S. PATENT DOCUMENTS

| | | | |
|---|---|---|---|
| 9,366,802 B2 | 6/2016 | Lee et al. | |
| 9,524,030 B2 | 12/2016 | Modarres et al. | |
| 10,031,360 B2 | 7/2018 | An et al. | |
| 10,120,224 B2 | 11/2018 | Lee et al. | |
| 10,831,293 B2 | 11/2020 | Jung et al. | |
| 10,916,226 B2* | 2/2021 | Oh | G06F 1/1652 |
| 11,822,225 B2* | 11/2023 | Moon | H04N 9/3173 |
| 2013/0275910 A1* | 10/2013 | Kim | G06F 1/1652 |
| | | | 715/800 |
| 2014/0380186 A1* | 12/2014 | Kim | G06F 1/1677 |
| | | | 715/746 |
| 2015/0220119 A1* | 8/2015 | Seo | G09G 5/37 |
| | | | 345/173 |
| 2020/0192557 A1* | 6/2020 | Yi | G06F 3/04815 |

* cited by examiner

*Primary Examiner* — Andre L Matthews
(74) *Attorney, Agent, or Firm* — ZAGORIN CAVE LLP; Robert W. Holland

(57) ABSTRACT

An information handling system display has a foldable display panel that incrementally transitions between a flat and fully curved configuration with an amount of curve set based on one or more of plural conditions, such as a distance to a view, an application selected to present visual information, a location and size of visual information presented in a window or other partial area of the display panel, a type of input device or other factors. An end user may configure the display to adjust display panel curve radius as desired by personal preference, and the display panel tracks manual curvature selections by an end user to adapt automatically to the end user's preferences.

19 Claims, 5 Drawing Sheets

INFORMATION HANDLING SYSTEM DISPLAY CURVATURE ADJUSTMENTS BASED ON VIEWING DISTANCE AND CONTENT

BACKGROUND OF THE INVENTION

Field of the Invention

The present invention relates in general to the field of information handling system displays, and more particularly to an information handling system display curvature adjustments based on viewing distance and content.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems include processing components in a housing that cooperate to process information, such as a central processing unit (CPU) that executes instructions to process information and a memory that stores the instructions and information. Generally, end users interact with the information handling system through input devices, such as a keyboard and mouse, and output devices, such as display that presents visual images. Portable information handling systems typically integrate input and output devices into a portable housing. Desktop and other types of stationary information handling systems typically interface with peripheral devices external to the housing, such as through USB or similar cables. Portable information handling systems also typically can interface with peripheral devices. For example, an integrated display of a portable information handling system is typically smaller than available peripheral displays so that an end user can have a larger viewing area to view visual images when a peripheral display is available. With the advent of high definition and ultra high definition resolution displays, peripheral displays have evolved to present visual images at very large surface areas.

One difficulty with large peripheral displays is that the visual image quality of the display can erode when the viewing angle from the display surface to an end user increases. The amount of degradation varies based upon the type of display, such as a liquid crystal display (LCD) or an organic light emitting diode (OLED) display, and the display presentation settings, such as brightness, contrast and color. With large display presentation surface areas, the viewing angle of an end user can vary considerably based upon the end user position and the portion of the display that presents visual images. For example, a centrally located end user will view a central pixel with zero degrees of viewing angle and will view pixels with an increased viewing angle as the pixels are located to the right or left of center. The increased viewing angle can cause the periphery of the display to have a noticeably poorer viewing quality compared to the interior of the display. This variance in quality becomes worse as the end user moves closer to the display, resulting in even greater viewing angles.

One solution that improves viewing quality for large display areas is to curve the display with a radius that provides a more direct viewing angle to a centrally located end user. Curved displays are available as LCDs and OLED display films in both peripheral display devices and portable information handling system integrated displays. In some instances, curved displays include an actuator that adjusts the display between a flat configuration and a fully curved configuration based upon an end user selection. The end user typically must manually select whether to view one of the flat configuration or the fully curved configuration, such as by judging which of these two options offers the more favorable image quality.

SUMMARY OF THE INVENTION

Therefore, a need has arisen for a system and method which incrementally adjusts a display curvature radius based upon image viewing context.

In accordance with the present invention, a system and method are provided which substantially reduce the disadvantages and problems associated with previous methods and systems for presenting visual images at a display. Image viewing context is applied to select a display curvature radius incrementally set between a flat viewing configuration and a fully curved configuration.

More specifically, an information handling system processes information with a processor and memory based upon end user inputs and presents the information as visual images at a display, such as an LCD or OLED display. The display includes a foldable display panel, an actuator to incrementally move the display panel between flat and curved configurations of varying curve radius, a processing resource to manage the actuator, and instructions stored in non-transitory memory that execute on the processing resource to adjust the display curvature radius based upon display context. The context includes a distance of an end user from the display, such as based on measurement of a time of flight proximity sensor, an application presenting visual images, a location and size of the visual images relative to the display area, a type of input device interacting with the information handling system, end user manual selections of radius, historical end user preferences related to display curvature radius, and display settings, such as color, contrast and brightness. End user preferences related to curvature radius settings for particular applications, distances and settings may be stored in a table that is referenced by the display or a display driver of the operating system.

The present invention provides a number of important technical advantages. One example of an important technical advantage is that an information handling system display incrementally adjusts curvature radius based upon a sensed distance to a viewer of visual images to automatically optimize visual image presentation across the entire display panel viewing area. Other viewing context is automatically applied to optimize the end user experience, such as by changing display curvature radius based upon a type of application that presents visual images and end user preferences stored in a curvature table.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system display increments from a flat configuration to a curved configuration based upon operating context for the presentation of visual images. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
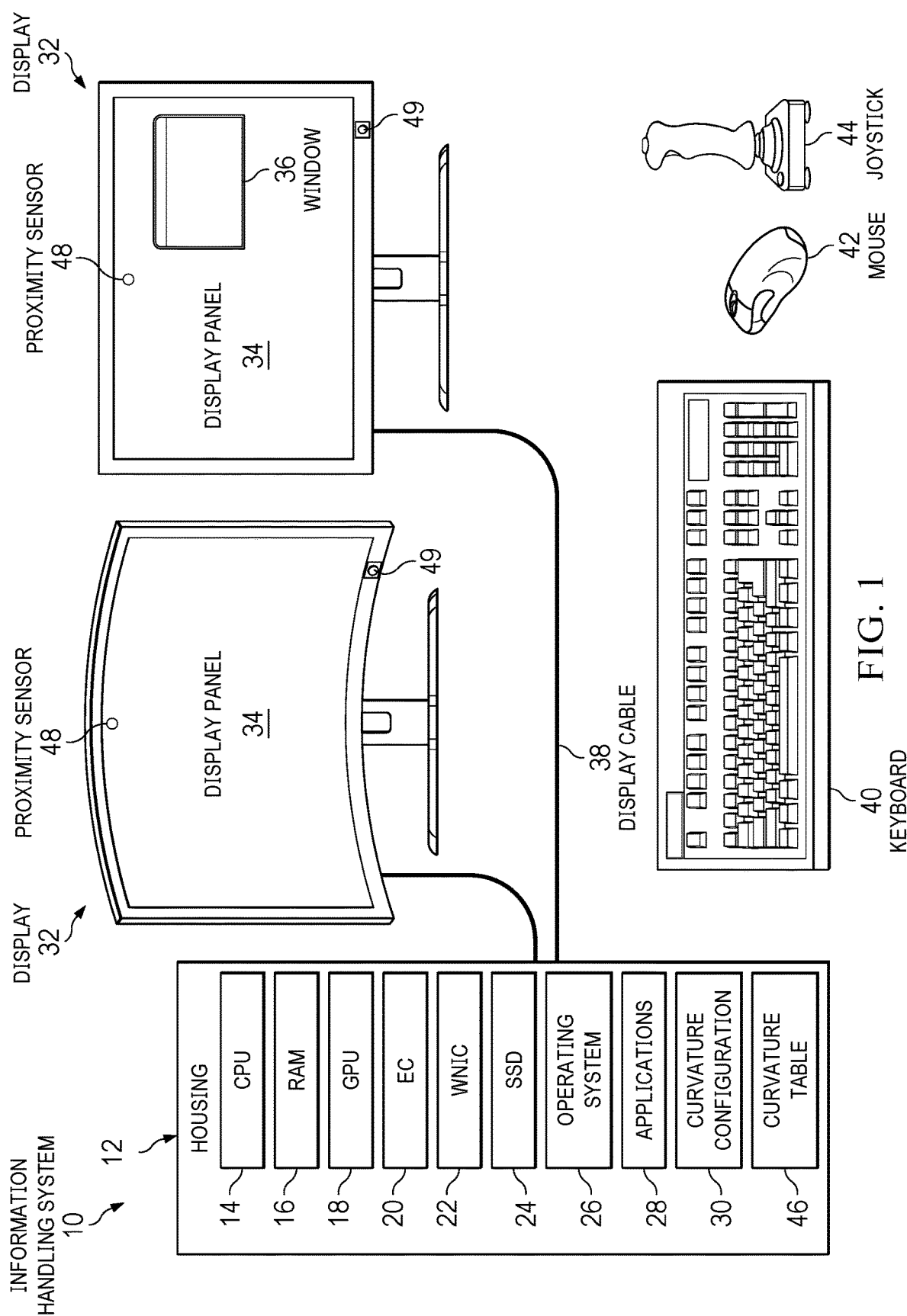
FIG. 1 depicts an information handling system that presents visual images at displays that incrementally adjust from a flat configuration to a curved configuration.

Referring now to FIG. 1, an information handling system 10 presents visual images at displays 32 that incrementally adjust from a flat configuration to a curved configuration. In the example embodiment, information handling system 10 has a desktop configuration with a housing 12 operating from a fixed position and interacting with an end user through a variety of peripheral devices. Information handling system 10 processes information by executing instructions on a central processing unit 14 in cooperation with a random access memory (RAM) 16 that stores the instructions and information. A graphics processing unit (GPU) 18 further processes the information to generate pixel values of a visual image for presentation at a display 32. An embedded controller 20 manages operations within housing 12 at a physical level, such as application of power and maintaining thermal constraints. Embedded controller 20 also manages communications with peripheral devices, such as accepted typed inputs from a keyboard 40, position inputs from a mouse 42 and gaming inputs from a joystick 44. A wireless network interface controller 22 manages wireless communications, such as through a wireless personal area network (WPAN) like Bluetooth and a wireless local area network (WLAN) like WIFI. A solid state drive 24 is a persistent storage device that saves information during power down periods, such as with flash memory or other types of non-transient memory.

In the example embodiment, SSD 24 stores an operating system 26 that executes on CPU 14 to support execution of applications 28, such as word processing, spreadsheet and gaming applications. Execution of operating system 26 and applications 28 generate visual images that are communicated from GPU 18 to displays 32 through display cables 38, such as bi-directional display cables like USB Type C and DisplayPort. Each display 32 has a foldable display panel 34 that incrementally transitions between a flat configuration and a curved configuration. As is described in greater detail below, a curvature configuration module 30 of instructions stored in SSD 24 references a curvature table 46 to manage an amount of curvature incrementally set at each display 32 based on the context of visual images presented at the displays and end user position viewing the displays. The context at the display is determined in part by a proximity sensor 48 that detects a distance to an end user, such as a time of flight sensor. Logic executing on a processing resource of information handling system 10 or display 32 applies the distance detected to an end user to determine a radius of display panel 34 that optimizes end user viewing and then commands an actuator to bend the display panel to the desired radius. Other content factors may impact the selected radius, such as the position of a window 36 on display panel 34 relative to an end user, such as the left, right or center position, and a size of the window relative to the size of the display panel. For instance, a small centrally located window will not have as much or any radius commanded for a given view distance compared with content that spans the complete display panel 34. Other context that can adjust a display panel radius, either more or less curved, include the type of application presenting visual images, the type of input devices, the number of displays and manual inputs made by an end user to change the radius through a manual input device 49 located at the display, such as a small joystick controller integrated in the display chassis. As an example, a fully curved display may provide an immersive experience for a game and be selected based upon the application executing at an information handling system or a joystick use; while a flat display may provide the most intuitive experience for a spreadsheet interaction regardless of end user viewing distance. As another example, end user manual selections may be stored and used as a reference of end user preferences for an application type or input device.

Figure 2B:
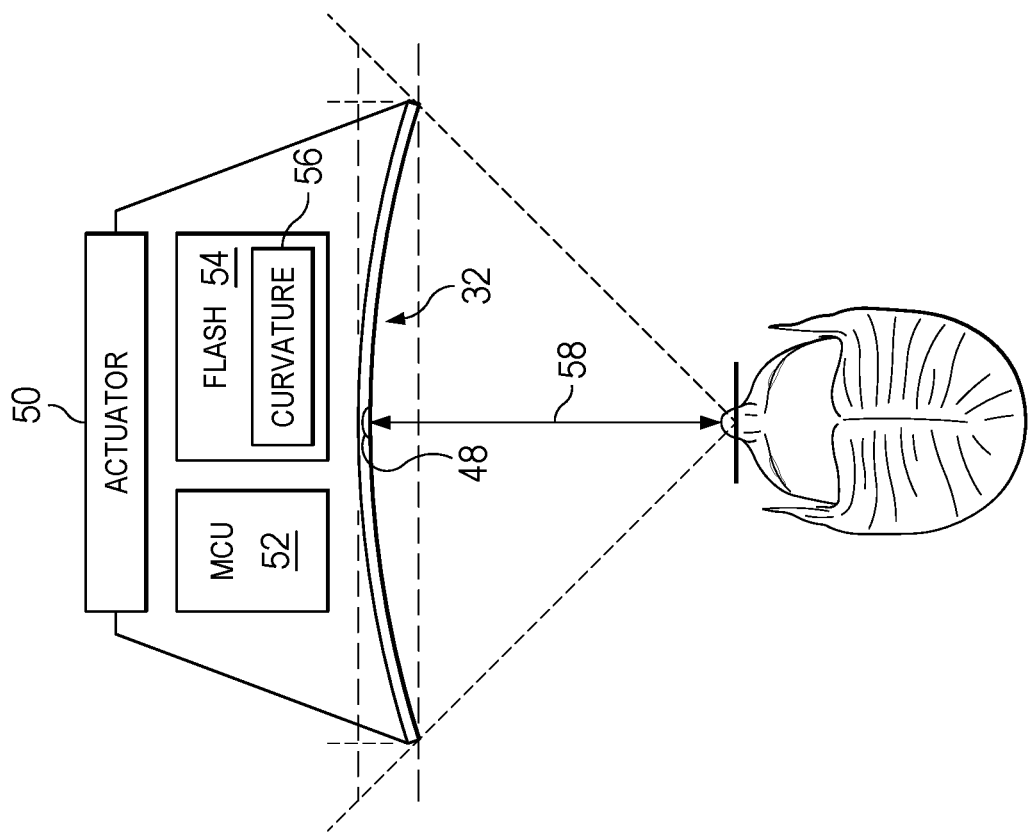
FIGS. 2A and 2B depict a top view of an end user interacting with a display to illustrate adjustments to display panel curve radius in response to sensed viewing distance.
Figure 2A:
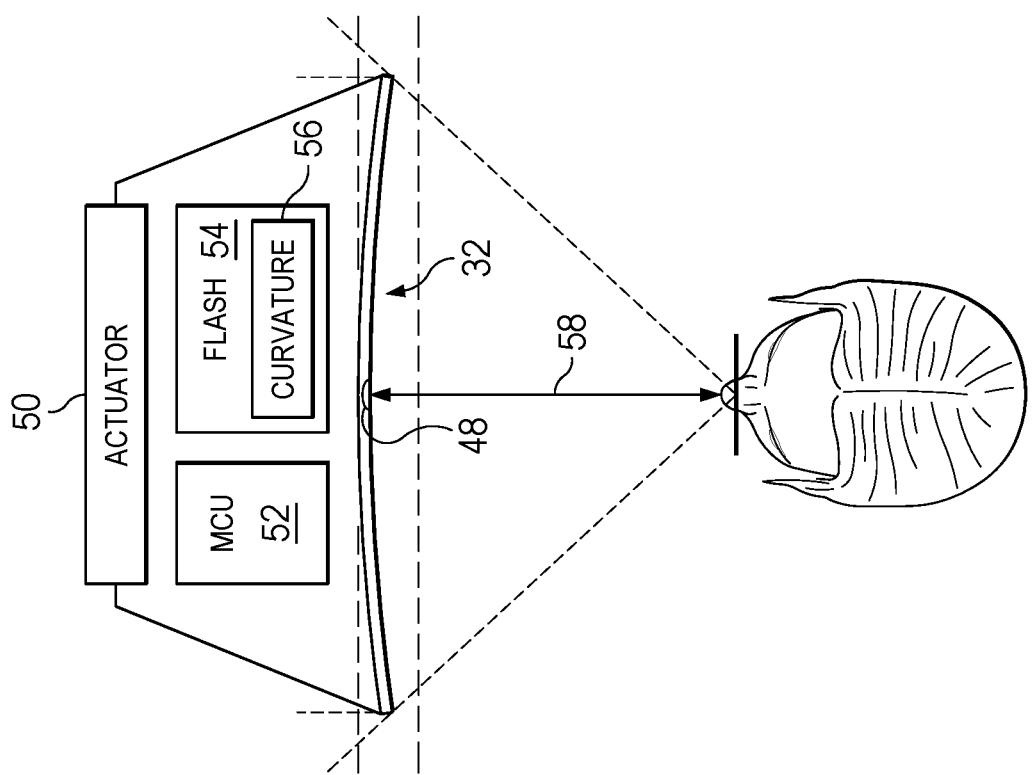

Referring now to FIGS. 2A and 2B, a top view depicts an end user interacting with a display to illustrate adjustments to display panel curve radius in response to sensed viewing distance. FIG. 2A depicts an end user at a distance of 600 mm from display 32 as detected by a proximity sensor 48, as compared with FIG. 2B having the end user at a distance of 500 mm from display 32 as detected by proximity sensor 48. An actuator 50, such as a stepper motor, managed by an MCU 52 or other processing resource, such as a timing controller or scalar, executes curvature control instructions 56 stored in flash memory 54 to adjust the amount of curve of display 32 based upon the sensed distance. In FIG. 2A, a distance of 600 mm sensed by proximity sensor 48 establishes display 32 with a reduced curve having a greater radius 58 than that of FIG. 2B having a distance 500 mm. The amount of curve in display 32 adjusts incrementally from a flat configuration to a fully curved orientation that is illustrated by FIG. 2B. The closer an end user is to display 32, the more curve is applied to display 32 with further adjustments performed based on other context as described above.

Figure 3:
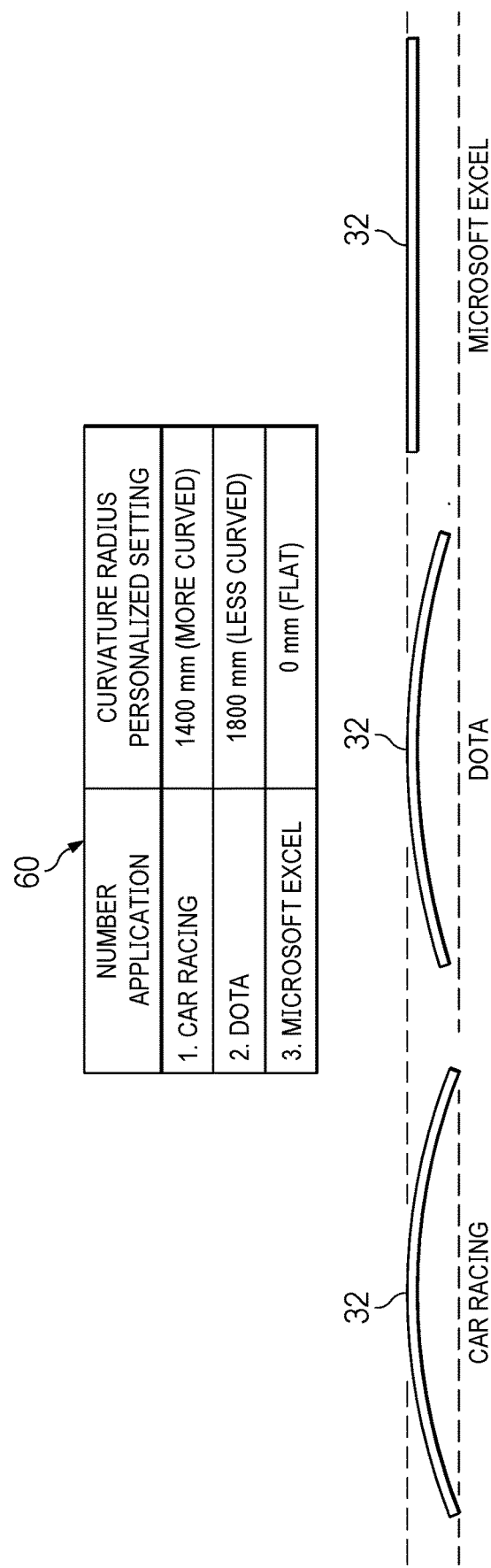
FIG. 3 depicts a block diagram that illustrates an example relationship of a curvature table having incremental display curves associated with different applications.

Referring now to FIG. 3, a block diagram illustrates an example relationship of a curvature table 60 having incremental display curves associated with different applications. In the example embodiment, curvature table 60 stores a personalized curvature radius setting for each of three applications: a car racing game application, a defense of ancients (DOTA) game application and a spreadsheet application. The car racing game application has a full curvature setting associated with it of 1400 mm and bending the display panel the full available amount. The DOTA game application has an intermediate curvature of less than the full available amount shown as 1800 mm. The spreadsheet application has a flat configuration associated with it having no curve radius. When an end user selects an application for presentation of visual information at a display, the curvature associated with the application is looked up from the curvature table 60 and applied at the display for presentation of visual images associated with the application. The curvature values may be manually set by an end user to automatically take effect at initiation of an application. Alternatively, the curvature values may be manually set to establish a relative curvature based on context. That is, for a given user distance, display brightness, ambient light, input device, window size, window position and/or other context, the car racing gaming application will have a proportionally greater curved display than the DOTA gaming application. Curvature table 60 may be populated through a user interface, such as with an operating system display driver, or by end user manual inputs over time that are interpreted by logic in the display driver to determine end user curvature preferences for each application and/or different types of applications, such as gaming and office applications.

Figure 4:
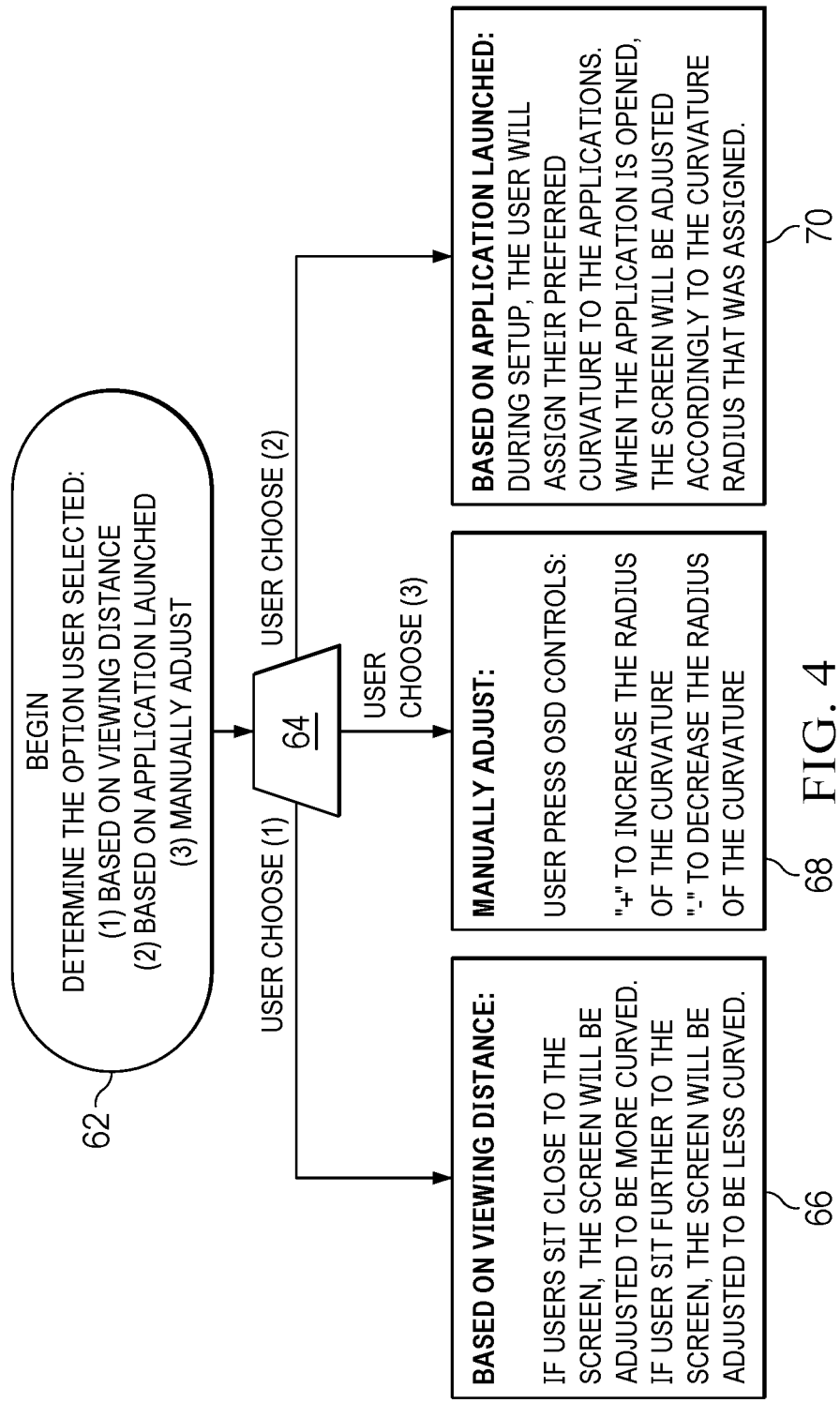
FIG. 4 depicts a flow diagram of a process for selecting an incremental display curvature setting for presentation of visual images.

Referring now to FIG. 4, a flow diagram depicts a process for selecting an incremental display curvature setting for presentation of visual images. The process begins at step 62 with a determination of an end user display curvature selection. In the example embodiment, the end user configures the display to present visual images with incrementally adjusted display configurations based upon a viewing distance sensed by a proximity sensor, based upon an application launched at the display for presentation of visual images and/or based upon manual curvature setting inputs. In one example embodiment, an end user may select one, two or all three options simultaneously. For example, a particular application has a display curvature associated with it that incrementally adjusts based upon a viewing distance to the display and manual adjustments by an end user over time while viewing visual images of the application. At step 64, the display curvature control is passed to a module based upon the end user selection of the control option at step 62. When viewing distance is selected, the process continues to step 66 to incrementally change the display curvature based upon a sensed distance, such as selecting a smaller display radius when the user is close up and a larger display radius as the distance to the user increases. When an application-based curvature option is selected, the process continues to step 70 where an end user sets up the display to have preferred curvatures for specific applications. When a configured application is launched at an information handling system, the display curvature radius is set to that radius value stored in association with the application. The curvature may be set with a command from the information handling system to the display that specifies the radius or may be set at the display based upon an identification of the application from the information handling system. When a manual adjustment is selected at step 62, the process continues to step 68 where the user interacts through an on screen display (OSD) menu to increment the radius to a greater or lower level.

Figure 5:
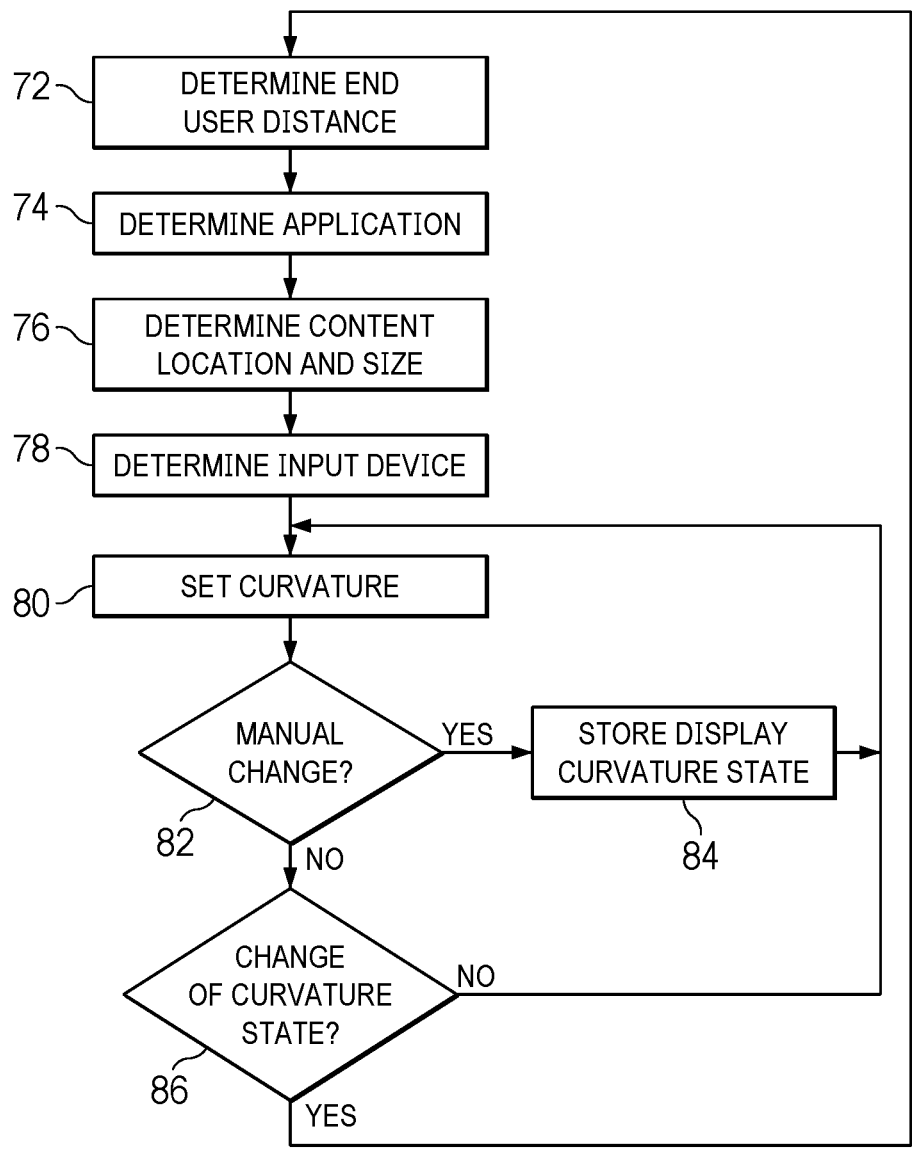
FIG. 5 depicts a flow diagram of a process for adjusting a display curvature for presentation of visual images with different contexts.

Referring now to FIG. 5, a flow diagram depicts a process for adjusting a display curvature for presentation of visual images with different contexts. The process is performed with instructions stored in non-transient memory and executed on one or more processing resources, such as the CPU, the MCU, a timing controller and/or a scalar. The process starts at step 72 by determining an end user distance to a display, such as with a proximity sensor. At step 74 a determination is made of what application is generating the visual images presented at the display. At step 76 a determination is made of the content location and size of the visual images, such as presentation at the full display or presentation at a window within the full display. At step 78 a determination is made of the type of inputs device associated with inputs to the visual images, such as a keyboard, mouse, joystick or display touchscreen touches. At step 80, the above context are applied to set the display curvature with a radius incrementally selected between flat and a fully curved state, such as setting a position of a step motor. The display radius setting may be further adjusted based upon historical end user manual inputs or other factors. Once the display radius is set, the process continues to step 82 to manually change the radius in response to end user incremental inputs. If a manual change is detected, the process continues to step 84 to store the display curvature state, such as the incremental setting, and then returns to step 80 to adjust the curvature. The stored manual changes are referenced for future adjustments that adapt to end user curvature preferences based upon the context. When no manual change is performed at step 82, the process continues to step 86 to determine if a change of display curvature state is needed based upon a change of context. If not, the process returns to step 80 to monitor the display curvature. If a change of curvature state is determined based upon a change in context, the process returns to step 72 to set the display radius based upon the context.

Although the present invention has been described in detail, it should be understood that various changes, substitutions and alterations can be made hereto without departing from the spirit and scope of the invention as defined by the appended claims.

What is claimed is:

1. An information handling system comprising:
    a processor operable to execute instructions that process information;
    a memory interfaced with the processor and operable to store the instructions and information;
    a persistent storage device interfaced with the processor and operable to store the instructions and information, the instructions including at least an operating system and plural applications;

a proximity sensor operable to detect a distance to an end user; and a display interfaced with the processor, the display having a foldable display panel operable to present the information as visual images and an actuator coupled to the foldable display panel to move the display panel between a flat configuration and a curved configuration, the display further having processing resource and a non-transitory memory, the processing resource interfaced with processor, the proximity sensor and the actuator, the non-transitory memory storing curvature instructions that when executed on the processing resource cause the actuator to incrementally configure the display panel from the flat configuration to the curved configuration with the amount of curve based at least in part on the distance detected by the proximity sensor;

wherein the curvature radius is further based upon a size of a content window relative to a size of the display panel.

2. The information handling system of claim 1 further comprising:

a table stored in the persistent storage device that associates one or more of the applications with a display panel curved configuration; and the curvature instructions when executed on the processing resource command a curvature radius of the display panel based upon the table when the one or more applications execute on the processor.

3. The information handling system of claim 2 wherein the curvature radius is further based upon the distance detected by the proximity sensor.

4. The information handling system of claim 3 further comprising curvature configuration instructions stored in the persistent storage that when executed on the processor cause presentation of a user interface to accept end user configuration settings for display panel curvature.

5. The information handling system of claim 4 wherein the end user configuration settings include a curvature radius, an adjustment of curvature radius based on the distance, and use or non-use of curvature with selected of the plural applications.

6. The information handling system of claim 3 wherein the curvature radius is further based upon a location of a content window on the display panel.

7. The information handling system of claim 1 further comprising:

a manual input at the display to adjust a radius of the configuration; and curvature instructions that when executed on the processing resource stores end user selections of radius in association with the distance and the application that presents visual images at the display panel.

8. The information handling system of claim 7 wherein:
the curvature instructions communicate the end user selections to the persistent storage; and
the operating system stores the end user selections in association with a display driver of the display.

9. A method for reporting server information handling system faults, the method comprising:
presenting visual images at a display;
detecting a distance to an end user viewing the display;
automatically adjusting a curvature of the display in increments from a flat configuration to a fully curved configuration based upon the distance;
detecting a location of a window presenting the visual images at the display; and
automatically adjusting the curvature based upon the location.

10. The method of claim 9 further comprising:
detecting an application that generates the visual images presented at the display; and
automatically adjusting the curvature based upon the application.

11. The method of claim 9 further comprising:
detecting a size of a window presenting the visual images at the display; and
automatically adjusting the curvature based upon the size.

12. The method of claim 9 further comprising:
detecting a type of input device controlling the visual images at the display; and
automatically adjusting the curvature based upon the type of input device.

13. The method of claim 9 further comprising:
accepting end use inputs to adjust the display curvature; and
storing the adjusted display curvature in association with the distance.

14. The method of claim 13 further comprising:
communicating the adjusted display curvature to an information handling system associated with the presenting visual images; and
storing the adjusted display curvature in association with an application executed to generate the visual images.

15. A display comprising:
a display panel operable to present visual images;
an actuator coupled to the display panel and operable to incrementally move the display panel between a flat configuration and a curved configuration;
a proximity sensor operable to detect a distance to an end user viewing the visual images;
a processing resource interfaced with the actuator and the proximity sensor; and
a non-transient memory storing instructions that when executed on the processing resource cause:
the actuator to incrementally configure the display panel from the flat configuration to the curved configuration with the amount of curve based at least in part on the distance detected by the proximity sensor and a location of a content window on the display panel.

16. The display of claim 15 further comprising:
a manual input at the display to adjust a radius of the configuration; and
instructions stored in the non-transient memory that when executed on the processing resource stores end user selections of radius in association with the distance.

17. The display of claim 15 wherein the instructions further cause the actuator to incrementally configure the display panel with the amount of curve based at least in part on the application that presents visual images at the display.

18. The display of claim 17 wherein the display panel comprises an organic light emitting diode film.

19. The display of claim 15 wherein the amount of curve radius is further based upon a size of a content window relative to a size of the display panel.

* * * * *